(12) United States Patent
Han et al.

(10) Patent No.: US 11,496,220 B2
(45) Date of Patent: Nov. 8, 2022

(54) WIRELESS OPTICAL TRANSCEIVER BASED ON POLARIZATION PULSE POSITION AND DIFFERENTIAL PHASE SHIFT MODULATION AND METHOD THEREOF

(71) Applicant: INDUSTRY-ACADEMIC COOPERATION FOUNDATION, YONSEI UNIVERSITY, Seoul (KR)

(72) Inventors: Sang-Kook Han, Seoul (KR); Won-Ho Shin, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 218 days.

(21) Appl. No.: 16/992,071

(22) Filed: Aug. 12, 2020

(65) Prior Publication Data

US 2021/0226707 A1 Jul. 22, 2021

(30) Foreign Application Priority Data

Jan. 22, 2020 (KR) .......... 10-2020-0008370

(51) Int. Cl.
*H04B 10/11* (2013.01)
*H04B 10/516* (2013.01)
(Continued)

(52) U.S. Cl.
CPC ....... *H04B 10/5161* (2013.01); *G02B 27/283* (2013.01); *H01S 3/06754* (2013.01);
(Continued)

(58) Field of Classification Search
CPC .. H04B 10/5161; H04B 10/66; H04B 10/532; H04B 10/5561; H04B 10/11;
(Continued)

(56) References Cited

U.S. PATENT DOCUMENTS

| 2004/0257167 A1* | 12/2004 | Kim | ............ | H04B 1/7176 |
| | | | | 332/112 |
| 2005/0069330 A1* | 3/2005 | Kao | ............ | H04B 10/541 |
| | | | | 398/188 |

(Continued)

OTHER PUBLICATIONS

Liu et al, Demonstration of 2.7 PPB Receiver Sensitivity Using PDMQPSK with 4 PPM, Sep. 2011, ECOC, All Document. (Year: 2011).*

(Continued)

*Primary Examiner* — Dibson J Sanchez

(57) ABSTRACT

A wireless optical transceiver, comprising: a light splitter for splitting light emitted from a light source into two lights; a data converter for dividing input data into a plurality of divided data in a symbol unit of a predetermined number of bits, and for converting values of a phase bit and a duty bit at a predetermined position in each of the divided data into a phase control signal and a blocking control signal; a modulator for polarization phase modulating two lights split according to the phase control signal, and for conveying or blocking two modulated polarized lights in response to the blocking control signal to modulate a pulse position; a polarized light combiner for generating a transmission optical signal by combining two polarized lights with a modulated polarization phase and a modulated pulse position; and a light amplifier for amplifying the transmission optical signal and transmitting it through a standby channel.

9 Claims, 8 Drawing Sheets

(51) Int. Cl.
G02B 27/28 (2006.01)
H01S 3/067 (2006.01)
H01S 3/16 (2006.01)
H04B 10/66 (2013.01)
H04B 10/524 (2013.01)
H04B 10/532 (2013.01)
H04B 10/556 (2013.01)

(52) U.S. Cl.
CPC ........... H01S 3/1608 (2013.01); H04B 10/66 (2013.01); H04B 10/11 (2013.01); H04B 10/524 (2013.01); H04B 10/532 (2013.01); H04B 10/556 (2013.01)

(58) Field of Classification Search
CPC ........................ H04B 10/556; H04B 10/2569; H04B 10/503; H04B 10/677; H04B 10/691; H04B 10/524; G02B 27/283; H01S 3/06754; H01S 3/1608
USPC .................. 398/118–131, 140–172, 182–201
See application file for complete search history.

(56) References Cited

U.S. PATENT DOCUMENTS

| | | | | |
|---|---|---|---|---|
| 2005/0117915 A1* | 6/2005 | Miyazaki | ........... | H04B 10/5053 398/188 |
| 2009/0060508 A1* | 3/2009 | Tanimura | ................ | H04J 14/06 398/65 |
| 2012/0224852 A1* | 9/2012 | Liu | .................... | H04L 27/3483 398/189 |
| 2012/0224862 A1* | 9/2012 | Liu | .................... | H04B 10/5161 398/152 |
| 2016/0134377 A1 | 5/2016 | Caplan et al. | | |
| 2017/0264369 A1* | 9/2017 | Li | ......................... | H04B 1/0042 |
| 2018/0069636 A1* | 3/2018 | Morra | .................. | H04B 10/524 |
| 2018/0097567 A1* | 4/2018 | LeGrange | ............ | H04B 10/293 |

OTHER PUBLICATIONS

Wang et al, Performance research of mPPM QPSK modulation signal for free space optical communication, Sep. 2019, Jilin University et al, All Document. (Year: 2019).*
Tian et al., Proposal and performance analysis on the PDM microwave photonic link, Mar. 2018, Beijing University of Posts and Telecommunications et al, All Document. (Year: 2018).*
Zhou et al, PDM DPSK MPPM hybrid modulation for multi hop free space optical communication, Nov. 2016, Jilin University, All Document. (Year: 2016).*
Elfiqi et al, (Chaotic Polarization Assisted LDPSK MPPM Modulation for Free Space Optical Communications), Sep. 2019, IEEE, All Document. (Year: 2019).*
Morra et al, (Hybrid direct detection differential phase shift keying multipulse pulse position modulation), Dec. 2015, Optics Communications, All Document. (Year: 2015).*
Rui et al, (An Optical Labeling Scheme with Novel DPSK PPM Orthogonal Modulation), 2010, Chinese Physics Letters vol. 27 No. 9, All Document. (Year: 2010).*
Yusuke Ito et al., "Performance of Multilevel Differential Polarization Shift Keying with Estimation of Inclined Polarization Axes over Atmospheric Turbulence Channel" 27th ITNAC, (2017).

* cited by examiner (a)

(b)

WIRELESS OPTICAL TRANSCEIVER BASED ON POLARIZATION PULSE POSITION AND DIFFERENTIAL PHASE SHIFT MODULATION AND METHOD THEREOF

CROSS-REFERENCE TO RELATED APPLICATION

This application claims priority under 35 U.S.C. 119(a) to Korean Patent Application No. 10-2020-0008370 filed on Jan. 22, 2020 in the Korean Intellectual Property Office, and all the benefits accruing therefrom under 35 U.S.C. 119, the contents of which in their entirety are herein incorporated by reference.

BACKGROUND

1. Technical Field

The present disclosure relates to a wireless optical communication system and a method thereof, and to a wireless optical transceiver based on a polarization pulse position and a differential phase shift keying and a method thereof.

2. Description of the Related Art

Currently, in optical communication, a differential phase shift keying (DPSK) technique, which modulates phases by changing polarization states between consecutive adjacent symbols, is mainly used. However, in the case of wireless optical communication, since a standby channel is not stable and continuously changes with time, it is necessary to be able to change a transfer rate according to a channel state. In the DPSK modulation technique, a delay-line interferometer is used by a receiver to detect a change in polarization state between consecutive adjacent symbols. Therefore, it is difficult to control a delay time of the delay-line interferometer, and thus it is difficult to implement a multi-rate.

To overcome this limitation, a polarization rotation-based DPSK technique was devised. In the polarization rotation-based DPSK technique, light emitted from a light source is divided into two polarized lights perpendicular to each other, and at least one of the two divided polarized lights is phase-modulated and transferred. A receiver combines two vertical polarized lights into one polarization to detect a phase difference and demodulate data. Since the DPSK technique based on polarization rotation does not use a delay-line interferometer, multi-rates may be easily implemented.

In the case of long-distance wireless optical communication, since optical attenuation occurs significantly while passing through the standby channel, it is difficult to establish a stable channel link only with output power of the light source. Accordingly, a transmitter uses a light amplifier such as an erbium-doped fiber amplifier (EDFA) that amplifies and outputs modulated light. However, the light amplifier such as the EDFA has a property in which average power is limited. As such, when the transmitter uses the EDFA having an average power limiting characteristic, a signal-to-noise ratio may not be improved due to the limited average power of the EDFA even if the polarization rotation-based DPSK technique is applied. As a result, the transfer rate may no longer be increased. In other words, even if the DPSK technique based on polarization rotation without using the delay-line interferometer is applied, there is a limit in improving the transfer rate.

SUMMARY

An object of the present disclosure is to provide a wireless optical transceiver and a method that may improve a signal-to-noise ratio by overcoming average power limit of a light amplifier.

Another object of the present disclosure is to provide a wireless optical transceiver and a method capable of significantly improving a transfer rate.

A wireless optical transmitter according to an embodiment of the present disclosure for achieving the above object includes a light splitter for splitting light emitted from a light source into two lights; a data converter for dividing input data into a plurality of divided data in a symbol unit of a predetermined number of bits, and for converting values of a phase bit and a duty bit, which is the remaining bit, at a predetermined position in each of the divided data into a phase control signal and a blocking control signal, respectively; a modulator for polarization phase modulating two lights split according to the phase control signal, and for conveying or blocking two modulated polarized lights in response to the blocking control signal to modulate a pulse position; a polarized light combiner for generating a transmission optical signal by combining two polarized lights with a modulated polarization phase and a modulated pulse position; and a light amplifier for amplifying the transmission optical signal and transmitting it through a standby channel.

The data converter may divide the input data into a plurality of divided data in the symbol unit specified by the number of bits corresponding to the number of slots for dividing a symbol period of the transmission optical signal, and output the same two phase control signals or output two different phase control signals according to a bit value of the phase bit in each of the divided data.

The data converter may determine a slot to which two modulated polarized lights are transferred among a plurality of slots divided in the symbol period according to a bit value of the duty bit, and may output the blocking control signal in a period corresponding to the remaining slots except for the determined slot.

The modulator may include a phase modulator for polarization phase modulating and outputting two split lights into two polarized lights having the same or vertical phase difference with each other; and a pulse position modulator for modulating the pulse position by adjusting a time period in which the two modulated polarized lights are conveyed in response to the blocking control signal.

The light amplifier may be implemented with an erbium-doped fiber amplifier (EDFA).

A wireless optical receiver according to another embodiment of the present disclosure for achieving the above object includes a polarized light adjustor for extracting a polarized light with a predetermined phase from a receive optical signal intermittently received through a standby channel; a polarized light splitter for splitting the polarized light extracted from the polarized light adjustor into two polarized lights perpendicular to each other; a polarized light rotation unit for rotating a phase of one of the two split polarized lights by 90 degrees; a light detector for detecting light by subtracting the remaining polarized light of the two split polarized lights and the polarized light whose phase is rotated each other; and a data restorer for restoring data in a divided data unit having the number of bits in a predetermined symbol unit, according to a position of a slot corresponding to a period in which light is detected and a polarized light of the period in which the light is detected, among a plurality of slots in which a symbol period of a receive optical signal is divided.

A method for transmitting wireless optical according to an embodiment of the present disclosure for achieving the above object includes splitting light emitted from a light source into two lights; dividing input data into a plurality of divided data in a symbol unit of a predetermined number of bits, and converting values of a phase bit and a duty bit, which is the remaining bit, at a predetermined position in each of the divided data into a phase control signal and a blocking control signal, respectively; polarizing phase modulating two lights split according to the phase control signal, and for conveying or blocking two modulated polarized lights in response to the blocking control signal to modulate a pulse position; generating a transmission optical signal by combining two polarized lights with a modulated polarization phase and a modulated pulse position; and amplifying the transmission optical signal and transmitting it through a standby channel.

A method for receiving wireless optical according to another embodiment of the present disclosure for achieving the above object includes extracting polarization of a predetermined phase from the receive optical signal intermittently received through a standby channel; splitting the polarized light extracted from the polarized light adjustor into two polarized lights perpendicular to each other; detecting light by subtracting the remaining polarized light and the polarized light whose phase is rotated among the two split polarized light; and restoring data in a divided data unit having the number of bits in a predetermined symbol unit, according to a position of a slot corresponding to a period in which light is detected and a polarized light of a period in which light is detected, among a plurality of slots in which a symbol period of a received optical signal is divided.

According to the wireless optical transceiver and the method thereof according to the embodiments of the present disclosure, it performs modulation and demodulation with a polarization position and differential phase shift technique that applies a duty cycle based modulation together with a polarization rotation based the DPSK technique. Therefore, not only the signal-to-noise ratio may be improved without exceeding the average power limit of the light amplifier, but also the transfer rate may be significantly improved.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Figure 1:
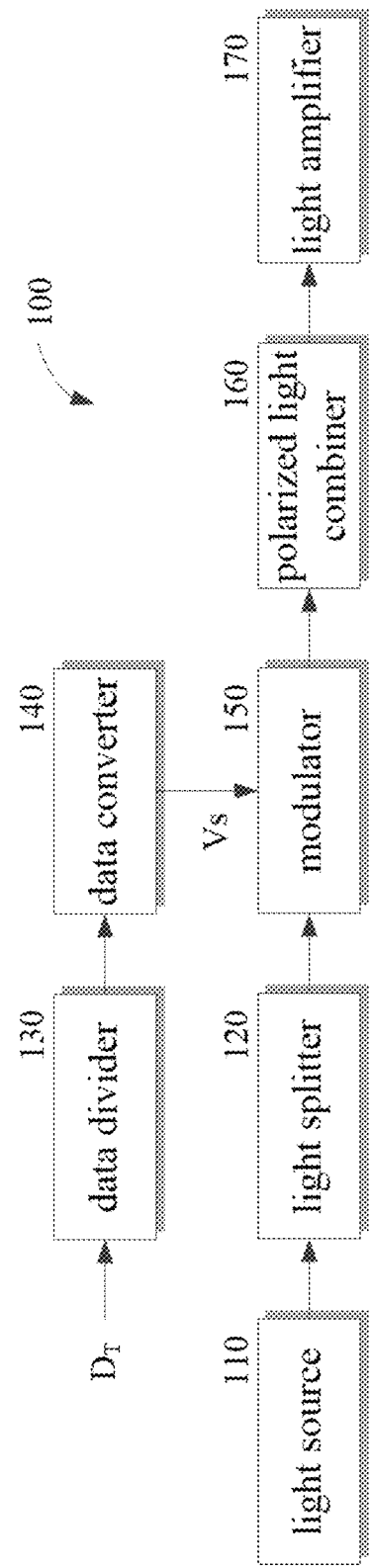
FIG. 1 shows a schematic structure of a transmitter in a wireless optical communication system according to an embodiment of the present disclosure.

Reference should be made to the accompanying drawings and the contents described in the accompanying drawings, which illustrate preferred embodiments of the present disclosure, to fully understand the present disclosure, the operational benefits of the present disclosure, and the objects achieved by the practice of the present disclosure.

Hereinafter, the present disclosure will be described in detail by explaining preferred embodiments of the present disclosure with reference to the accompanying drawings. However, the present disclosure may be implemented in various different forms, and is not limited to the described embodiments. In addition, parts irrelevant to the description are omitted to clearly describe the present disclosure, and the same reference numerals in the drawings indicate the same members.

Throughout the specification, when a part "includes" a certain component, this means that other components may not be excluded, and other components may be further included unless otherwise stated. In addition, terms such as " . . . unit," " . . . part," "module," and "block" described in the specification mean a unit that processes at least one function or operation, and it may be implemented in hardware or software or a combination of hardware and software.

Figure 2:
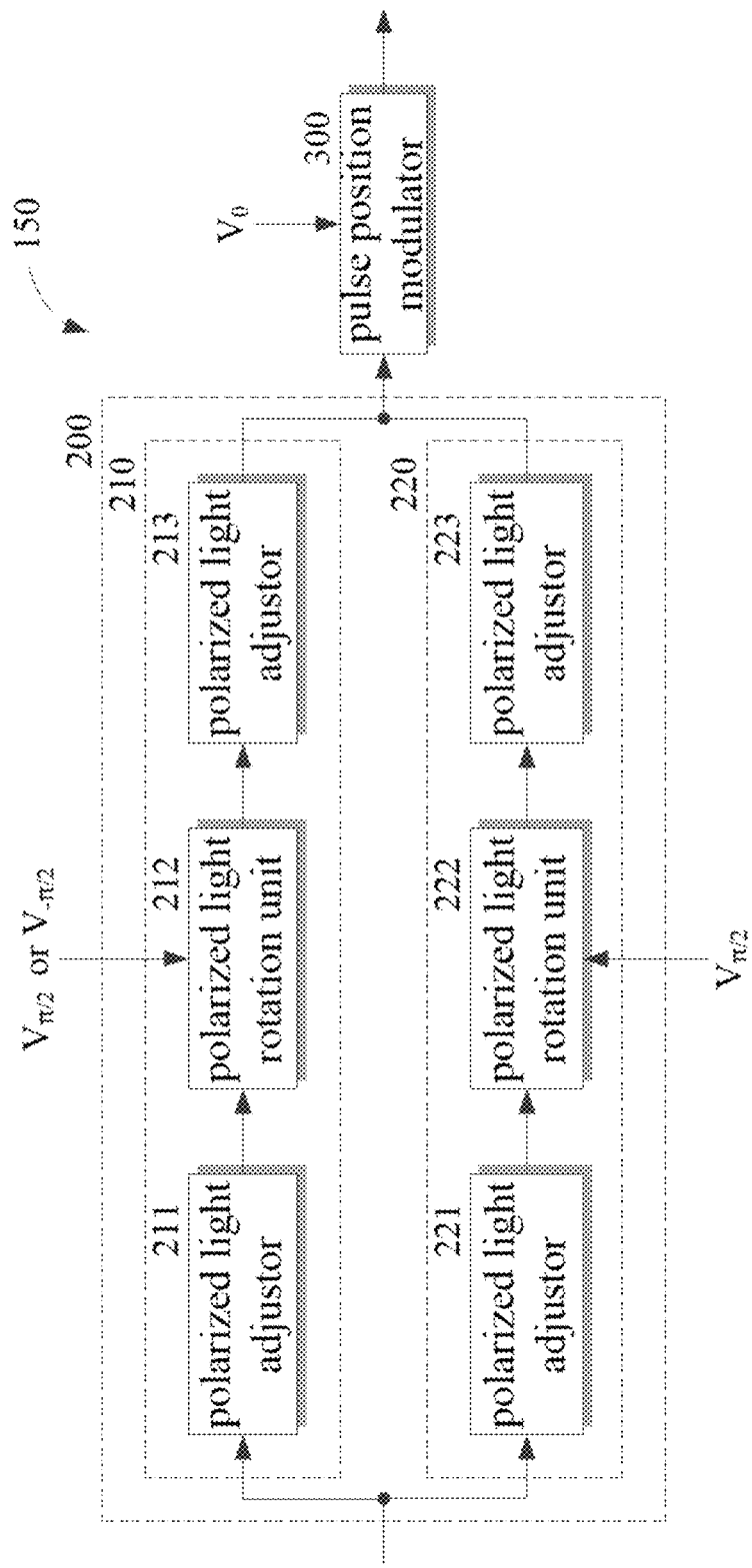
FIG. 2 shows a detailed configuration of a modulator of FIG. 1.
Figure 3:
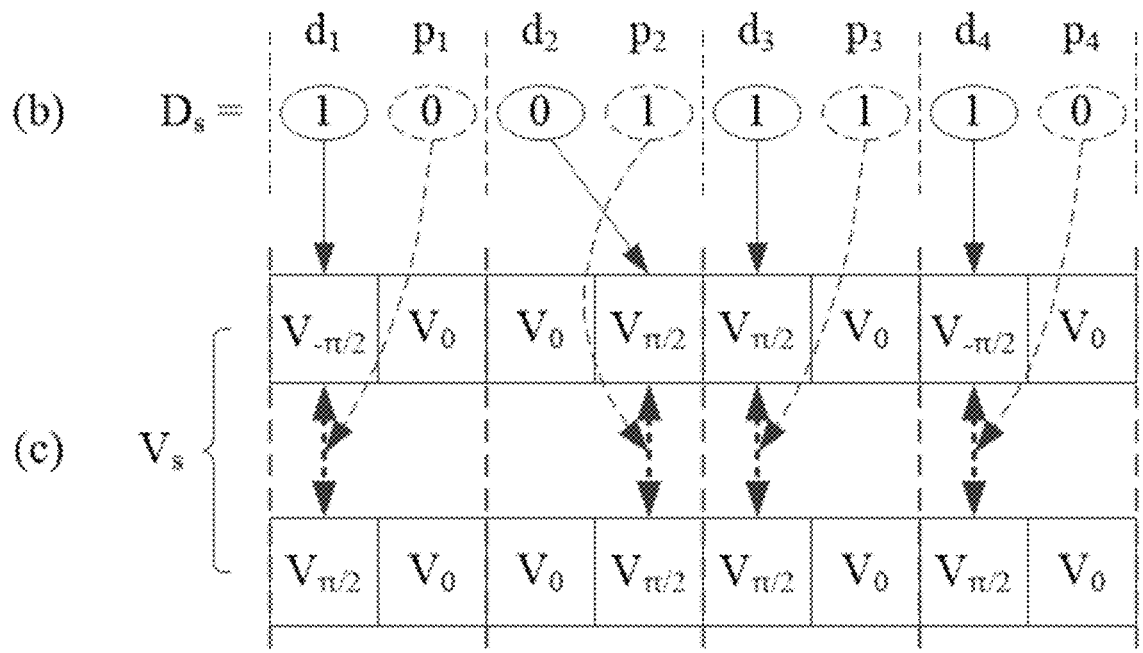
FIG. 3 shows an example in which the transmitter of FIG. 1 modulates data.
Figure 3:
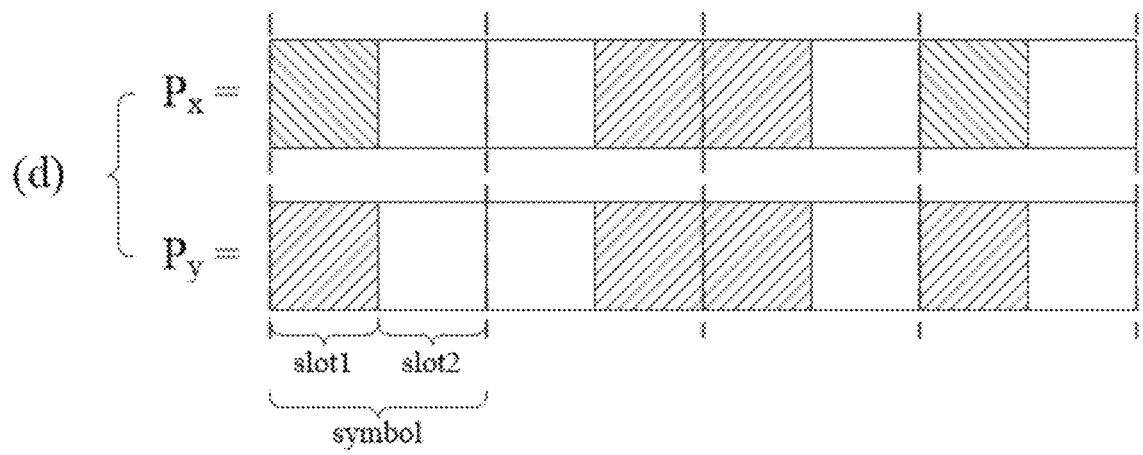
Figure 3:
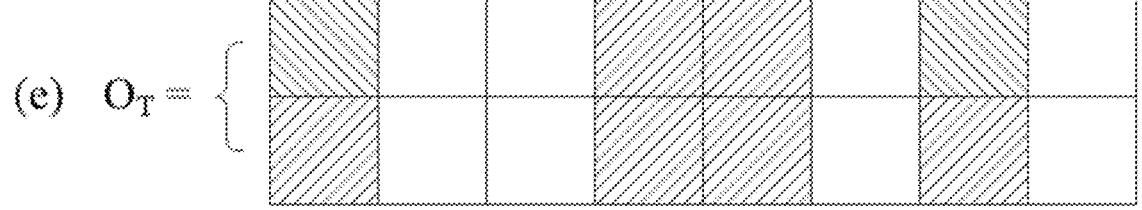
Figure 4:
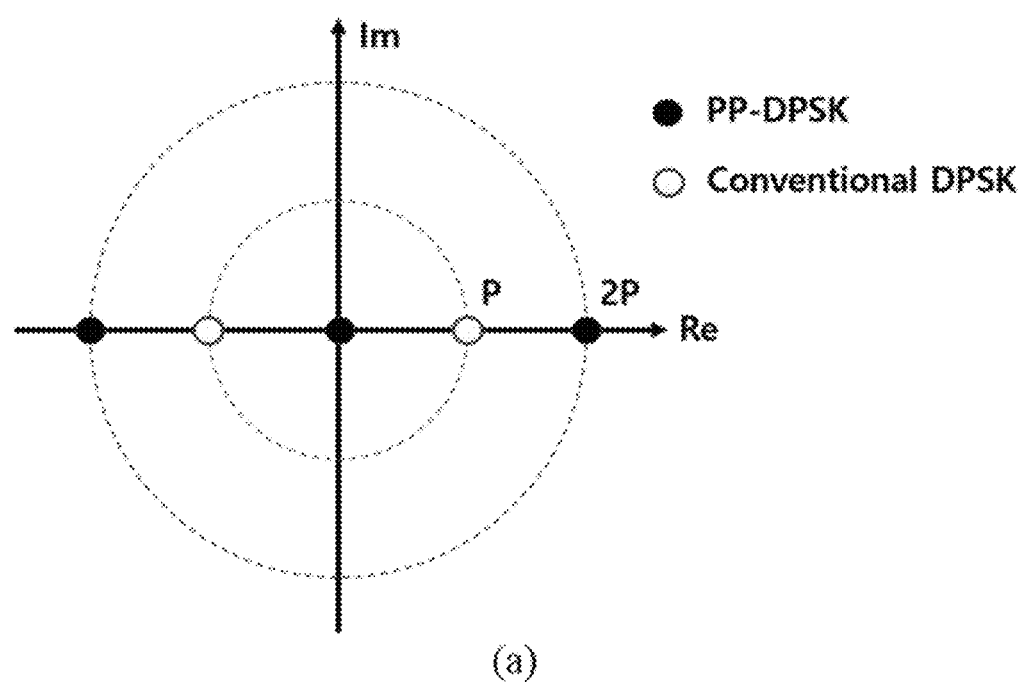
FIG. 4 shows a characteristic of an optical signal modulated by the transmitter of FIG. 1.
Figure 4:
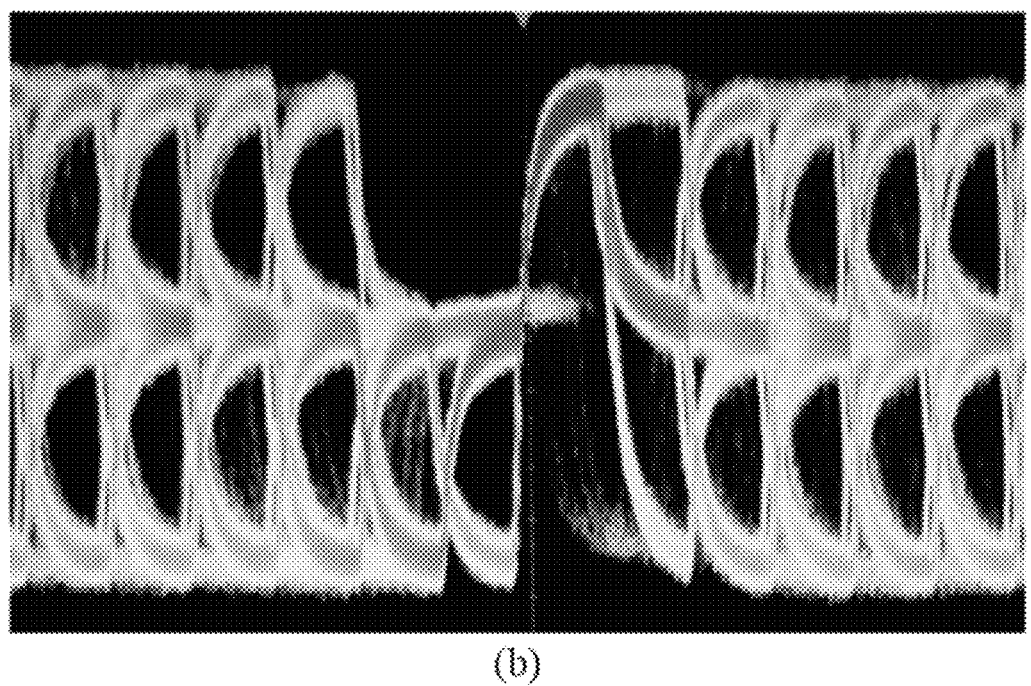

FIG. 1 shows a schematic structure of a transmitter in a wireless optical communication system according to an embodiment of the present disclosure. FIG. 2 shows a detailed configuration of a modulator of FIG. 1. FIG. 3 shows an example in which the transmitter of FIG. 1 modulates data. FIG. 4 shows a characteristic of an optical signal modulated by the transmitter of FIG. 1.

Referring to FIG. 1, the transmitter according to the present embodiment includes a light source 110, a light splitter 120, a data divider 130, a data converter 140, a modulator 150, a polarized light combiner 160, and a light amplifier 170.

The light source 110 generates and emits light having a predetermined wavelength and waveform. As an example, the light source may generate and emit light in a continuous wave mode, and may be embodied as a laser diode.

The light splitter 120 splits the light emitted from the light source 110 into two lights of the same intensity. The light splitter 120 may be implemented as a 3 dB combiner, for example, and split the light applied from the light source 110 into two lights of uniform intensity to apply to the modulator 150.

Meanwhile, the data divider 130 receives transmission data $D_T$ to be transmitted to a receiver and divides the transmission data $D_T$ in a symbol unit of a predetermined number of bits. The symbol unit may be variously set, but it is assumed here that it is set to 2 bits as an example. In this case, the data divider 130 may obtain the divided data $D_s$ by dividing the applied transmission data $D_T$ in 2-bit units. As shown in (a) of FIG. 3, when the transmission data $D_T$ is applied as "1001110" in 8 bits, the data divider 130 may obtain four divided data $D_s$ by dividing the transmission data $D_T$ into 2-bit units that are a symbol unit such as "10," "01," "11," and "10."

The data divider 130 may classify and divide the transmission data $D_T$ applied in a specified symbol unit even when the transmission data $D_T$ is continuously applied in the form of a data stream.

The data converter 140 converts the data divided by the symbol unit in the data divider 130 into a control signal $V_s$ for controlling the modulator 150 according to bit values of their respective bit positions. The data converter 140 sets one bit at a specified position in each of the divided data $D_s$ divided into 2-bit units as a duty bit d, and sets the remaining bits as a phase bit p. Here, for example, it is assumed that a first bit of the divided data $D_s$ is set as the duty bit d, and a second bit is set as the phase bit p.

In addition, the data converter 140 generates a control signal $V_s$ for controlling the modulator 150 according to each bit value of the set duty bit d and the set phase bit p. Here, the data converter 140 converts each of the bit values of the duty bit d and the phase bit p into two control signals $V_s$ so that the modulator 150 may modulate two lights split by the light splitter 120.

The data converter 140 obtains the two control signals $V_s$ for modulating two lights split by the light splitter 120 according to the bit value of the phase bit p to a polarization in a predetermined phase direction.

When the bit value of the phase bit p is 0, for example, the data converter 140 may convert the two control signals $V_s$ into different predetermined phase control signals $V_{-\pi/2}$ and $V_{\pi/2}$. When the bit value of the phase bit p is 1, the data converter 140 may convert the two control signals $V_s$ into the same phase control signals $V_{\pi/2}$ and $V_{\pi/2}$. Here, a first phase control signal $V_{\pi/2}$ is a signal for controlling the modulator 150 to modulate the applied light with polarization of $\pi/2$ phase, and a second phase control signal $V_{-\pi/2}$ is a signal for controlling the modulator 150 to modulate the applied light with polarization of $-\pi/2$ phase.

In addition, the data converter 140 determines a time period in which a blocking control signal $V_0$ predetermined in the symbol is applied to the modulator 150 according to the bit value of the duty bit d, allows the phase control signal $(V_{\pi/2}, V_{\pi/2})$ or $(V_{-\pi/2}, V_{\pi/2})$ to be applied to the remaining time period, and then, converts the divided data $D_s$ into a combination of four control signals $V_s$. Here, the blocking control signal $V_0$ is a signal for controlling the modulator 150 to block the applied light so that it is not conveyed to the polarized light combiner 160 afterwards. When the bit value of the duty bit d is 0, the data converter 140 may cause the blocking control signal $V_0$ to be output in a time period corresponding to a first slot slot1, and cause the phase control signal $(V_{\pi/2}, V_{\pi/2})$ or $(V_{-\pi/2}, V_{\pi/2})$ converted according to the phase bit p to be output in a time period corresponding to a second slot slot2. On the other hand, when the bit value of the duty bit d is 1, it may cause the blocking control signal $V_0$ to be output in the time period corresponding to the second slot slot2, and cause the phase control signal $(V_{\pi/2}, V_{\pi/2})$ or $(V_{-\pi/2}, V_{\pi/2})$ converted according to the phase bit p to be output in the time period corresponding to the first slot slot1.

As an example, as shown in (c) of FIG. 3, since a bit value of the phase bit $p_1$ of the first divided data $D_{s1}$ among the four divided data $D_s$ divided into "10," "01," "11," and "10" is 0, the phase bits $p_1$ are converted into different phase control signals $V_{-\pi/2}$ and $V_{\pi/2}$. In addition, since the bit value of the duty bit $d_1$ is 1, the converted phase control signals $V_{-\pi/2}$ and $V_{\pi/2}$ are first output in the time period corresponding to the first slot 1, and the blocking control signal $V_0$ is output in the time period corresponding to the second slot slot2.

Since the bit value of the phase bit $p_2$ is 1 in the second divided data $D_{s2}$, the phase bit p2 is converted into the same phase control signals $V_{\pi/2}$ and $V_{\pi/2}$. In addition, since the bit value of the duty bit $d_2$ is 0, the blocking control signal $V_0$ is first output in the time period corresponding to the first slot slot1, and the converted phase control signals $V_{\pi/2}$ and $V_{\pi/2}$ are output in the time period corresponding to the second slot slot2.

Similarly, the third and fourth divided data $D_{s3}$ and $D_{s4}$ may also be converted into a combination of the phase control signals $V_{-\pi/2}$ and $V_{\pi/2}$ and the blocking control signal $V_0$.

In the above, the bit positions of the duty bit d and the phase bit p may be changed. In addition, a signal level of the phase control signals $V_{-\pi/2}$ and $V_{\pi/2}$ according to the bit value of the phase bit p and a sequence of time periods in which the phase control signals $V_{-\pi/2}$ and $V_{\pi/2}$ and the blocking control signals $V_0$ are output according to the duty bit d may be set in various ways. In other words, the manner in which the data converter 140 converts the divided data $D_s$ into the control signal $V_s$ may be variously set.

In addition, for convenience of explanation, the data divider 130 and the data converter 140 are illustrated separately, but the data divider 130 may be included in the data converter 140.

The modulator 150 modulates the two lights split and applied by the light splitter 120 in response to the control signal $V_s$ applied from the data converter 140. The modulator 150 may modulate two polarized lights of two identical phases or two polarized lights of different phases in response to the phase control signal among the control signals $V_s$. In addition, the modulator 150 may convey or block light to the polarized light combiner 160 in response to the blocking control signal V0 among the control signals $V_s$. In other words, the modulator 150 may perform differential phase shift keying according to the phase control signals $V_{-\pi/2}$ and $V_{\pi/2}$ for the two light applied to be perpendicular to each other, while it may perform optical position modulation together according to the blocking control signal $V_0$. Here, since the polarization position modulation is performed by conveying light or adjusting a blocking time period, it may be referred to as pulse position modulation or duty modulation.

Referring to FIG. 2, the modulator 150 may include a phase modulator 200 for converting two lights into polarized lights in response to the phase control signals $V_{-\pi/2}$ and $V_{\pi/2}$ among the control signals $V_s$ and for phase modulating the converted polarized lights, and a pulse position modulator 300 for conveying or blocking the phase modulated polarized light from the phase modulator 200 to the polarized light combiner 160 in response to the blocking control signal $V_0$ among the control signals $V_s$.

The phase modulator 200 includes first and second polarization modulators 210 and 220 for receiving the corresponding light among the two lights separated from the light splitter 120 and for modulating each applied polarization in response to the corresponding phase control signal among the phase control signals.

The first and second polarization modulators 210 and 220 include two polarized light adjustors (211, 213) and (221, 223) and a polarized light rotation unit (212, 222) arranged between the two polarized light adjustors (211, 213) and (221, 223). Here, the polarized light rotation unit 212 and 222 may be implemented as, for example, a Mach-Zehnder modulator (MZM).

The first polarized light adjustor 211 of the first polarization modulator 210 receives a corresponding light among the two lights split by the light splitter 120, and it converts an electric field vector (or magnetic field vector) into polarized light that vibrates in an applied predetermined direction. The polarized light rotation unit 212 adjusts a polarization direction of the polarized light converted by the first polarized light adjustor 211, that is, a phase of the polarized light in response to the phase control signal $V_{-\pi/2}$ or $V_{\pi/2}$ applied from the data converter 140. As an example, the polarized light rotation unit 212 may rotate the polarized light such that the phases of the polarized lights output according to the applied phase control signal $V_{-\pi/2}$ or $V_{\pi/2}$ are perpendicular to each other, as shown in (d) of FIG. 3. In other words, it modulates the phase of the polarized light. In addition, the second polarized light adjustor 213 precisely adjusts and outputs the polarized light modulated by the polarized light rotation unit 212 to be polarized to the required direction.

The first polarized light adjustor 221 of the second polarization modulator 220 receives a corresponding light among the two lights split by the light splitter 120, and converts an electric field vector (or magnetic field vector) into polarized light that vibrates in an applied predetermined direction. The polarized light rotation unit 222 adjusts a polarization direction of the polarized light converted by the first polarized light adjustor 221, that is, a phase of the polarized light in response to the phase control signal $V_{\pi/2}$ applied from the data converter 140. Here, since only the same phase control signal $V_{\pi/2}$ is applied to the polarized light rotation unit 222, the polarized light rotation unit 212 always outputs the polarized light with the same phase as shown in (d) of FIG. 3. In addition, the second polarized light adjustor 223 precisely adjusts and outputs the polarized light modulated by the polarized light rotation unit 212 to be polarized to the required direction.

Therefore, when the two phase control signals $V_{\pi/2}$ and $V_{\pi/2}$ having the same two phase control signals are applied, the phase modulator 200 modulates light so that the polarized lights with the same phase are output. When different phase control signals $V_{-\pi/2}$ or $V_{\pi/2}$ are applied, the phase modulator 200 modulates light so that the polarized lights with the phases perpendicular to each other are output.

When the blocking control signal $V_0$ among the control signals $V_s$ is applied, the pulse position modulating unit 300 blocks two polarized lights conveyed from the phase modulator 200, as shown in (d) of FIG. 3. However, when the blocking control signal V0 is not applied, it conveys the two polarized lights conveyed from the phase modulator 200 to the polarized light combiner 160. In other words, the pulse position modulator 300 conveys or blocks the polarized light applied from the phase modulator 200, so that the polarized light may be conveyed to the polarized light combiner 160 in the form of a pulse, and a position of the pulse may be adjusted.

By classifying a symbol into two slots slot1 and slot2 and using a combination of the two classified slots slot1, slot2 and the two polarized lights, 2-bit data may be expressed in a single symbol.

Therefore, in the present embodiment, the modulator 150 may be considered to perform polarization pulse position-differential phase shift keying (PP-DPSK).

In the above, it has been described that the phase modulator 200 modulates the phase of the polarized light first, and then the pulse position modulator 300 conveys or blocks the modulated polarized light. However, a position of the pulse position modulator 300 may be variously adjusted to a stage before the phase modulator 200. For example, the pulse position modulator 300 may block or convey the two lights split by the light splitter 120, and the phase modulator 200 may perform polarization phase modulation on two lights conveyed through the pulse position modulator 300. Also, in some cases, the pulse position modulator 300 may be arranged between the light source 110 and the light splitter 120 to convey or block light emitted from the light source 110 to the light splitter 120.

As shown in (e) of FIG. 3, the polarized light combiner 160 combines the two polarized lights that are modulated and transmitted by the modulator 150 to obtain a transmission optical signal $O_T$.

The light amplifier 170 amplifies an intensity of the transmission optical signal $O_T$ obtained from the polarized light combiner 160 to output the transmission optical signal amplified wirelessly through a standby channel. Here, the light amplifier 170 may be implemented with an EDFA. As described above, since a light amplifier such as the EDFA has an average power limiting characteristic, the intensity of the transmission optical signal that may be amplified is limited in the existing DPSK technique. However, in the present embodiment, since the pulse position modulator 300 of the modulator 150 blocks light in a time period corresponding to ½ in response to the blocking control signal $V_0$, the light amplifier 170 uses only ½ of power. Accordingly, the intensity of the two polarized lights conveyed by being phase-modulated according to the phase control signal $V_{-\pi/2}$ or $V_{\pi/2}$ may be amplified to twice the intensity compared to the conventional one. In other words, a signal-to-noise ratio of the transmission optical signal may be doubled. That is, it is possible to obtain an additional gain of 3 dB. A transfer rate may be doubled based on the additional gains thus obtained.

Considering only the phase-modulated optical signal, although a rate at which the phase modulated optical signal is transferred is doubled, since the time period during which the optical signal is conveyed is reduced to ½, the data amount of the optical signal which is transmitted does not substantially change. However, in the present embodiment, it is possible to determine a bit value of the additional data from the time period in which the phase modulated optical signal is conveyed. Therefore, despite the average power limiting characteristic of the light amplifier 170, it is possible to double the transfer rate of the transmission optical signal in wireless optical communication.

As shown in (a) of FIG. 4, the transmitter 100 according to the present embodiment may amplify the intensity of the two polarized lights of the transmission optical signal to 2 times 2 P the light intensity P that may be transferred in the existing DPSK technique. In addition, the transmitter 100 transfers or blocks the transmission optical signal in a pulse form so that it may be used together to a time period during which the optical signal is blocked, so that 2 bits of data may be expressed in a single symbol.

(b) of FIG. 4 shows an eye pattern of the optical signal output from the transmitter 100. As shown in (b) of FIG. 4, it may be seen that the transmitter 100 of the present embodiment may transfer four types of optical signals.

In the above, it is described that the data divider 130 divides the transmission data $D_T$ into 2-bit units to obtain the divided data $D_s$, performs phase modulation for the polarized light for 1 bit in the 2-bit divided data $D_s$, modulates the remaining 1-bit into a time period during which the phase-modulated polarized light is transferred, thereby doubling the transfer rate.

However, the transmitter 100 according to the present embodiment may also transfer data by improving the transfer rate by more than twice. If one wants to further improve the transfer rate, the data divider 130 of the transmitter 100 obtains the divided data $D_s$ by dividing the data in a symbol unit having a number of bits exceeding 2 bits (for example, 3), phase modulates the polarized light according to the bit value of the 1-bit phase bit p, and determines the time period during which the phase modulated polarized light is conveyed according to the bit value of the remaining duty bit d, thereby enabling to modulate and transfer a position of a pulse. As the time period during which the phase modulated polarized light is conveyed is shortened, the light amplifier 170 is not limited by the average power limit. Therefore, the transfer rate may be further improved by amplifying the intensity of the optical signal more greatly.

Figure 5:
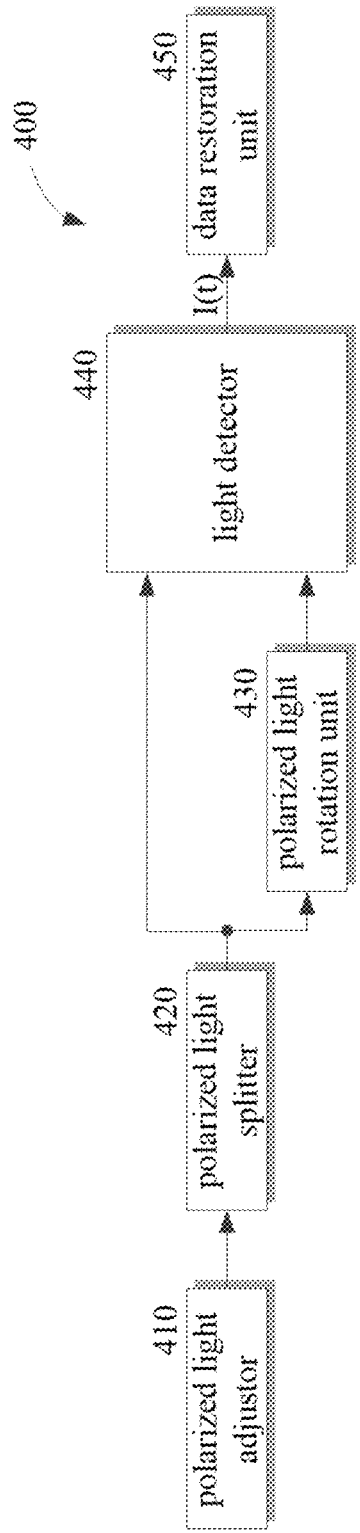
FIG. 5 shows a schematic structure of a receiver in a wireless optical communication system according to an embodiment of the present disclosure.
Figure 6:
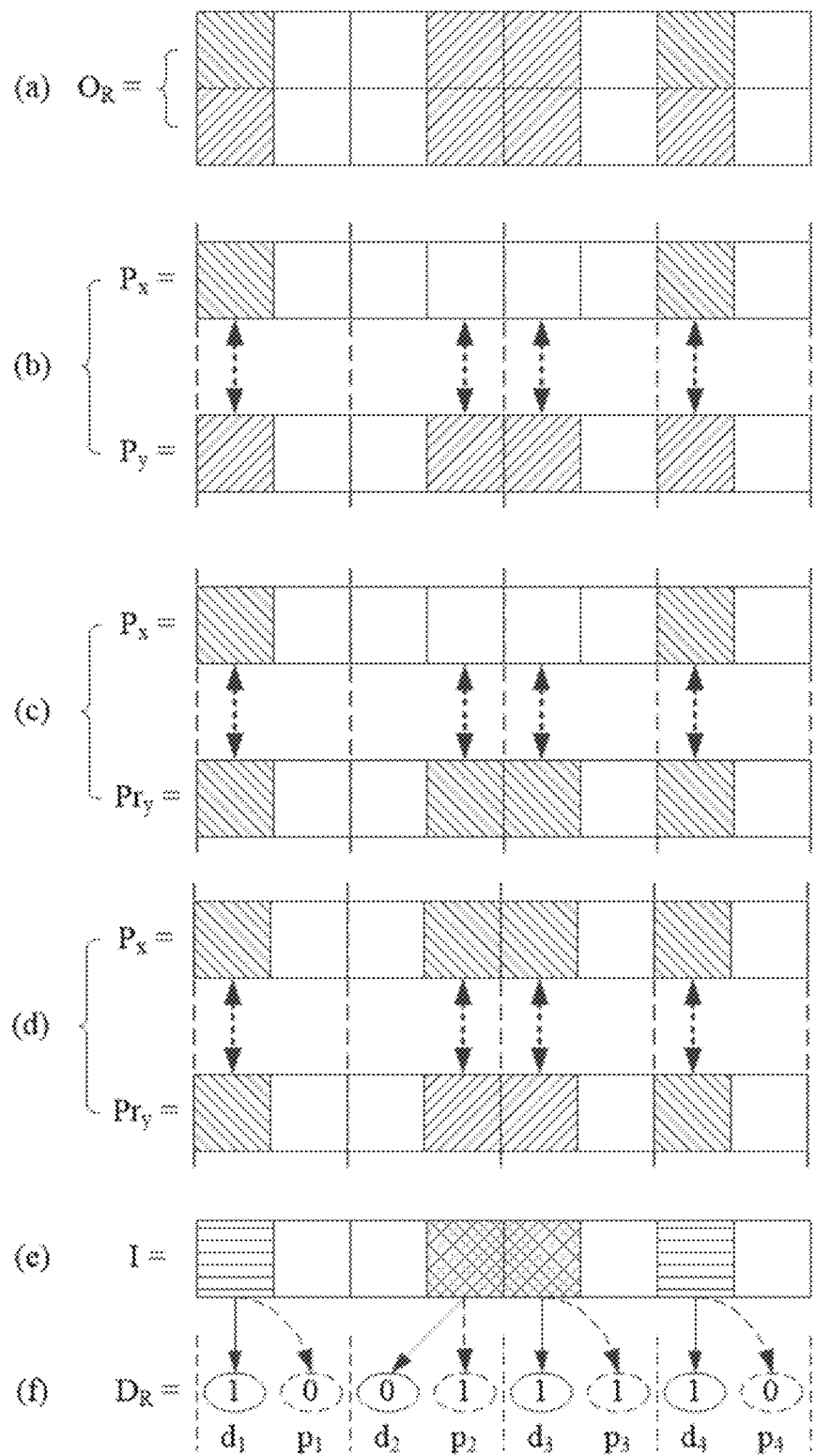
FIG. 6 shows an example in which the receiver of FIG. 5 demodulates data.

FIG. 5 shows a schematic structure of a receiver in a wireless optical communication system according to an embodiment of the present disclosure, and FIG. 6 shows an example in which the receiver of FIG. 5 demodulates data.

Referring to FIG. 5, the receiver 400 includes a polarized light adjustor 410, a polarized light splitter 420, a polarized light rotation unit 430, a light detector 440, and a data restorer 450.

An operation of a receiver 400 in a wireless optical communication system according to the present embodiment will be described with reference to FIGS. 5 and 6. First, the polarized light adjustor 410 receives the receive optical signal $O_R$ transferred through a wireless standby channel and adjusts a polarized light of the receive optical signal $O_R$ so as to have a predetermined phase. As described above, in the transmitter 100, two polarized lights with the same phase or with phases perpendicular to each other according to the phase control signals $V_{-\pi/2}$ and $V_{\pi/2}$ may be outputted or blocked in the transmission optical signal $O_T$. Therefore, when the transmission optical signal $O_T$ is applied to the receive optical signal $O_R$ through the standby channel, the receive optical signal $O_R$ may include only two polarized lights with the maximum predetermined phase.

However, during the transmission optical signal $O_T$ is transferred through the standby channel, distortion or interference may occur, and thus may be received in the receive optical signal $O_R$. In other words, the phase of the polarized light included in the receive optical signal $O_R$ may be changed. When the receive optical signal $O_R$ is applied, the polarized light adjustor 410 of the receiver 400 adjusts a polarization component of the receive optical signal $O_R$ to a predetermined phase and outputs it as shown in (a) of FIG. 6.

The polarized light splitter 420 receives the phase adjusted receive optical signal $O_R$ from the polarized light adjustor 410 and splits it into two polarized lights to output them as shown in (b) of FIG. 6. Here, the two split polarized lights have a vertical phase difference from each other. One of the two split polarized lights is conveyed to the light detector 440 through the polarized light rotation unit 430, while the other one does not pass through the polarized light rotation unit 430, but is directly conveyed to the light detector 440.

The polarized light rotation unit 430 receives one of the two polarized lights split by the polarized light splitter 420, rotates 90 degrees, and outputs it as shown in (c) of FIG. 6. As described above, the two split polarized lights are polarized lights perpendicular to each other. Therefore, the polarized light rotated by 90 degrees in the polarized light rotation unit 430 has the same phase as the other polarized light, or a 180 degrees phase difference. Here, the polarized light rotation unit 430 may be implemented as a Faraday rotator mirror (FRM) or the like.

The light detector 440 receives one polarized light directly applied from the polarized light splitter 420 and the polarized light rotated by the polarized light rotation unit 430 to subtract each other so as to detect light. When the light detector 440 subtracts the two applied polarized lights to each other, the intensity of the polarized light is doubled if the two polarized lights have a 180 degree phase difference. On the contrary, if they have the same phase, they cancel each other out. In other words, the polarization component is removed.

In particular, in the present embodiment, the light detector 440 may classify between a period in which light is detected and a period in which light is not detected, as shown in (d) of FIG. 6. In addition, the light detector 440 may classify and detect the polarized light amplified in the period where the light is detected and the light from which the polarization component is removed. In other words, as shown in (a) of FIG. 4, three different light states may be detected.

In addition, it generates a current I(t) according to the detected light state and conveys it to the data restorer 450. The light detector 440 may obtain the current I(t) as shown in Equation 1.

$$I(t)=2R\sqrt{P_x(t)P_y(t)}i(t)\cos\{\theta_x(t)-\theta_y(t)\}$$ [Equation 1]

where R represents a radius corresponding to an intensity of a signal of the existing DPSK shown in (a) of FIG. 4, $P_x(t)$ and $P_y(t)$ represent two polarized lights of the receive optical signal $O_R$, respectively, and $\theta_x(t)$ and $\theta_y(t)$ represent phases of the two polarized lights.

The data restorer 450 restores data corresponding to the receive optical signal $O_R$ transferred according to the current I(t) conveyed from the light detector 440.

As shown in (e) of FIG. 6, the data restorer 450 classifies a period in which light is detected and a period in which no light is detected. If the period in which the light is detected is advanced in the symbol period, it is determined that the bit value of the duty bit d is 1, and the first bit of the divided data $D_s$ is restored to 1 in the restored data $D_R$. On the contrary, if the period in which no light is detected is advanced in the symbol period, it is determined that the bit value of the duty bit d is 0, and the first bit of the divided data $D_s$ is restored to 0.

In addition, if a polarized light does not appear in the period where the light is detected, it is determined that the bit value of the phase bit p is 0, and the second bit of the divided data $D_s$ is restored to 0. However, if the polarized light appears, it is determined that the bit value of the phase bit p is 1, and the second bit of the divided data $D_s$ is restored to 1.

As a result, the restored data $D_R$ restored by the data restorer 450 may be restored to the same data as the transmission data $D_T$. In other words, the receiver 400 may accurately restore the transmission data $D_T$ transmitted from the transmitter 100.

Figure 7:
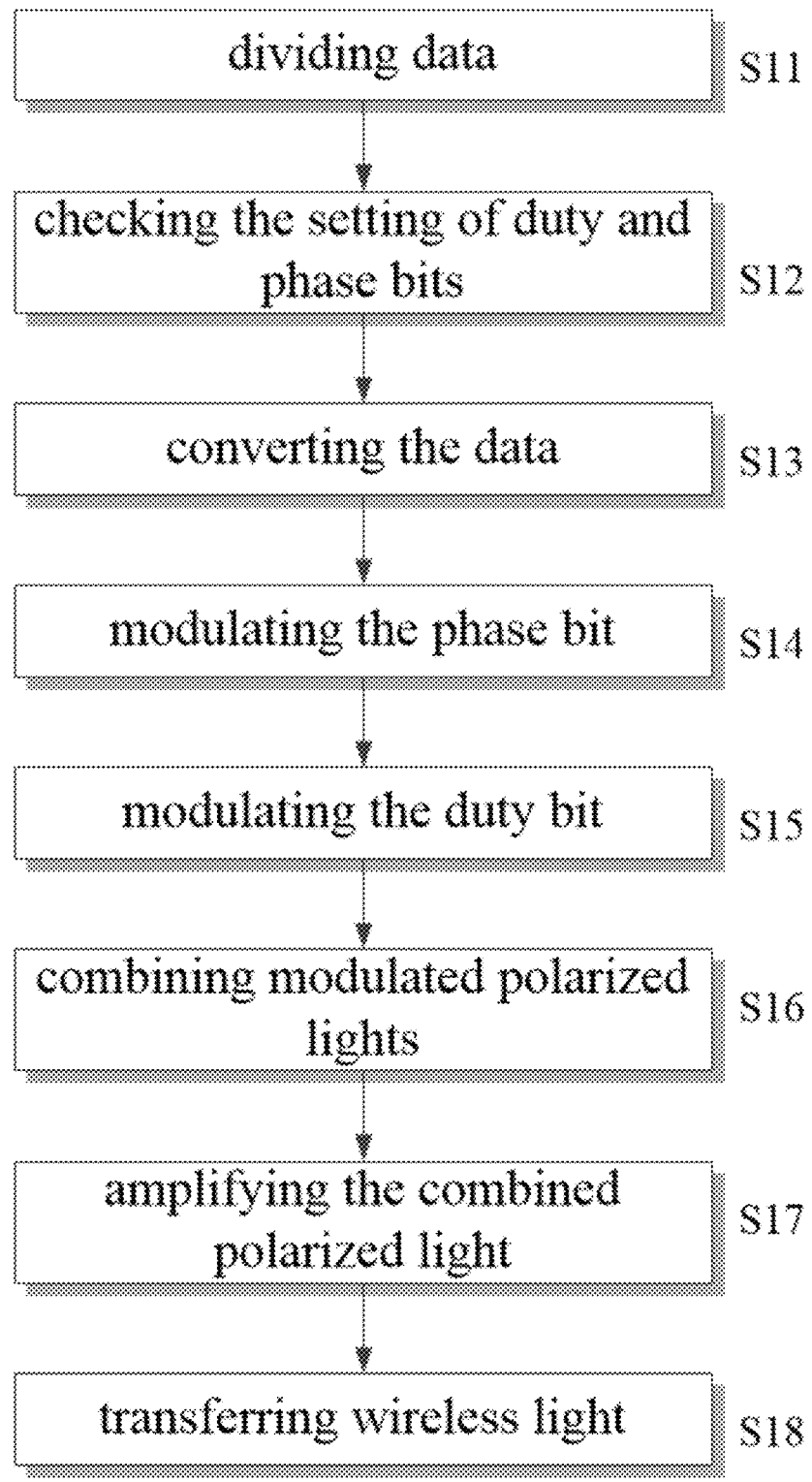
FIG. 7 shows a method for transmitting in a wireless optical communication system according to an embodiment of the present disclosure.

FIG. 7 shows a method for transmitting in a wireless optical communication system according to an embodiment of the present disclosure.

A method for transmitting in FIG. 6 will be described with reference to FIGS. 1 to 4. First, Transmission data $D_T$ to be transmitted is divided into a plurality of pieces of divided data $D_s$ in a symbol unit of a predetermined number of bits (S11). Then, a setting for a position of a 1-bit phase bit p to be modulated is checked based on a phase difference of polarized lights in the plurality of divided data $D_s$, and settings for a position of the remaining duty bit d to be modulated according to the position of the polarized light and a position of a slot corresponding to the duty bit in a symbol divided into a plurality of slots slot1, slot2 (S12).

Here, it is assumed that the symbol unit is 2 bits, a first bit is the duty bit d and a second bit is the phase bit p in the 2-bit divided data $D_s$.

When the setting of the phase bit p and the duty bit d in the divided data $D_s$ is checked, data of the phase bit p and the duty bit d are converted into a control signal $V_s$ (S13).

At this time, first, the data of the phase bit p is converted into two phase control signals $V_{-\pi/2}$ and $V_{\pi/2}$. Here, when the bit value of the phase bit p is 0, for example, the two control signals $V_s$ may be converted into different predetermined phase control signals $V_{-\pi/2}$ and $V_{\pi/2}$. When the bit value of the phase bit p is 1, the two control signals $V_s$ may be converted into the same phase control signals $V_{\pi/2}$ and $V_{\pi/2}$.

Then, the data of the duty bit d is converted into a blocking control signal $V_0$. When the bit value of the duty bit d is 0, the blocking control signal $V_0$ may be output in a time period corresponding to a first slot slot1. When the bit value of the duty bit d is 1, the blocking control signal $V_0$ may be outputted in a time period corresponding to a second slot slot2.

When the data of the divided data $D_s$ is converted into the control signal $V_s$, light emitted from a light source and split into two are modulated into a polarized light with a phase corresponding to the phase control signals $V_{\pi/2}$ and $V_{\pi/2}$ among the control signals $V_s$ (S14). When bit values of the phase bits p are converted into the same phase control signals $V_{\pi/2}$ and $V_{\pi/2}$, the two lights are modulated into the polarized lights with the same phase. When they are converted into different phase control signals $V_{-\pi/2}$ and $V_{\pi/2}$, the two lights are polarization phase modulated with a 90-degree phase difference from each other.

By conveying or blocking the two light modulated into the polarized lights in response to the blocking control signal $V_0$, pulse position modulation is performed so that the polarized lights are conveyed in the form of a pulse according to the bit value of the duty bit d (S15).

Then, the polarization phase and the pulse position modulated two polarized lights are combined to generate a transmission optical signal (S16). Then, the transmission optical signal is amplified using a light amplifier (S17). Here, the pulse position modulated polarized light is not continuously applied, but is intermittently applied according to the bit value of the duty bit d. Therefore, even if a light amplifier having an average power limit is used, it may be amplified with a signal intensity that is more than 2 times higher than that of the polarized light that is not pulse position modulated but only polarization phase modulated.

Then, the amplified transmission optical signal is wirelessly transferred to the receiver 400 through a standby channel (S18).

Figure 8:
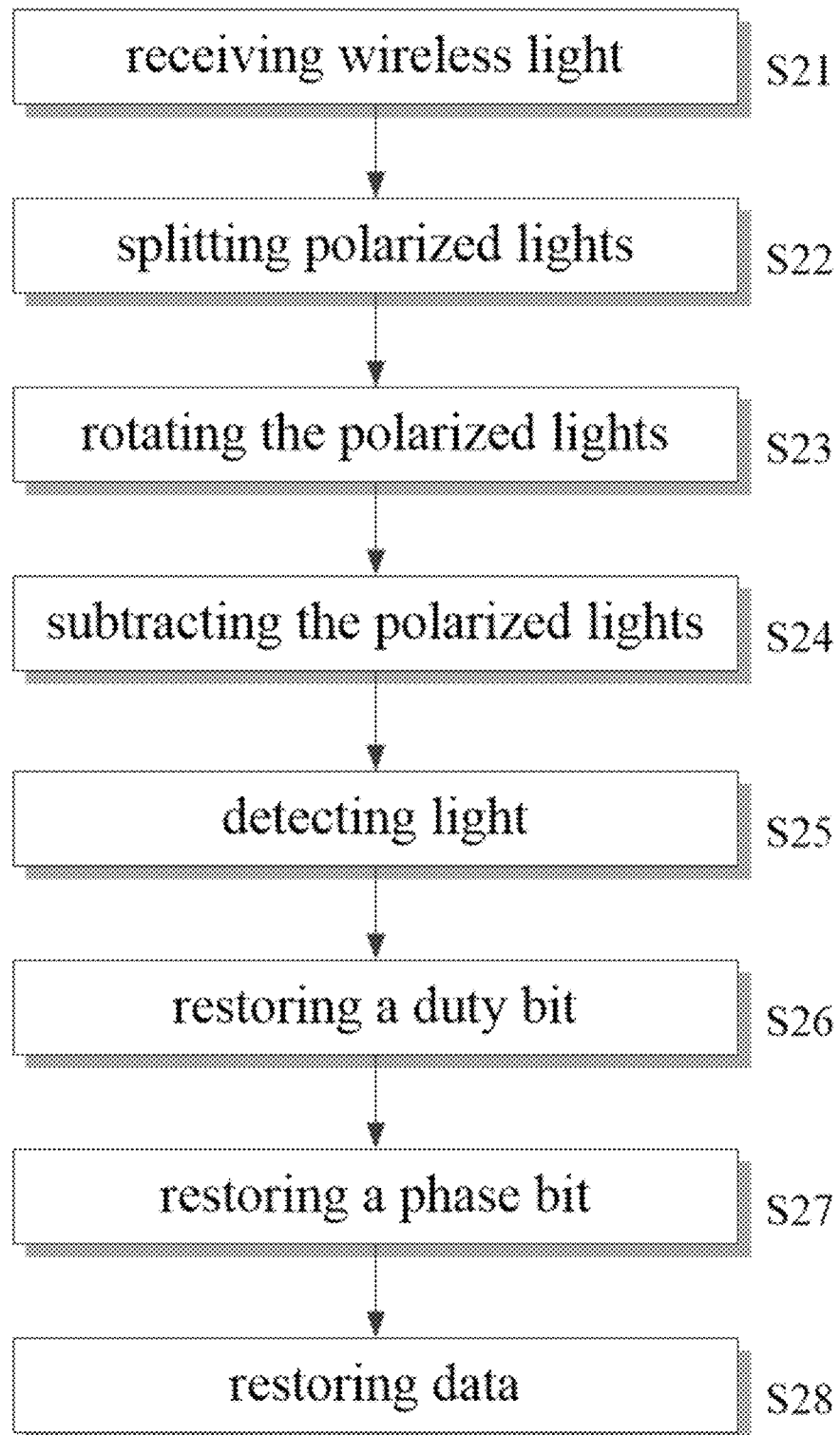
FIG. 8 shows a method for receiving in a wireless optical communication system according to an embodiment of the present disclosure.

FIG. 8 shows a method for receiving in a wireless optical communication system according to an embodiment of the present disclosure.

A method for receiving in FIG. 8 will be described with reference to FIGS. 5 and 6. First, wireless light is received through a standby channel (S21). Here, the receive optical signal may be intermittently applied by pulse position modulation in a transmitter 100. Then, polarized lights of the receive optical signal may be adjusted to polarized lights with a predetermined phase.

Next, the receive optical signal is split into two polarized lights (S22). Here, the split two polarized lights are polarized lights having a vertical phase difference from each other, and one of the two divided polarized light is rotated by 90 degrees (S23). The polarized light rotated by 90 degrees has the same phase as the other polarized light, or a 180-degree phase difference. Then, the two polarized lights are subtracted from each other (S24). When the two polarized lights are subtracted from each other, an intensity of the polarized light is doubled if the two polarized lights have a 180-degree phase difference, whereas polarization components are removed by canceling each other if they are in the same phase.

After that, light is detected (S25). Here, the light may be classified into a period in which light is detected and a period in which no light is detected. In the period in which light is detected, the amplified polarized light and the light from which the polarization component has been removed may be classified and detected.

Then, bit values of a duty bit d of divided data $D_s$ is restored from restored data $D_R$ by classifying the period in which the light is detected and the period in which no light is detected (S26). If the period in which the light is detected is advanced in a symbol period, the bit value of the duty bit d may be restored to 1. If the period in which no light is detected is advanced the symbol period, the bit value of the duty bit d may be restored to 0.

When the bit value of the duty bit d is restored, the bit value of the phase bit p is restored from the polarized light in the period in which the light is detected (S27). Here, it the polarized light does not appear, the bit value of the phase bit p may be restored to zero, and if the polarized light appears, the bit value of the phase bit p may be restored to 1.

When both the duty bit d and the phase bit p of the divided data $D_s$ are restored, the restored duty bits d and phase bits p are arranged according to a predetermined set position to restore data (S28). As an example, the divided data $D_s$ may be restored by arranging the duty bit d at a first bit position of the divided data $D_s$ and the phase bit p at a first bit position. Then, other divided data $D_s$ may be restored in the same manner.

The method according to the present disclosure may be implemented as a computer program stored in a medium for execution on a computer. Here, a computer-readable medium may be any available medium that may be accessed by a computer and may also include any computer storage medium. A computer storage medium includes both volatile and nonvolatile, removable and non-removable media implemented in any method or technology for storage of information such as computer readable instructions, data structures, program modules, or other data, and it may include read only memory (ROM), random access memory (RAM), compact disk (CD)-ROM, digital video disk (DVD)-ROM, magnetic tape, floppy disk, optical data storage, or the like.

Although the present disclosure has been described with reference to the embodiment shown in the drawings, this is only exemplary. It may be understood that various modifications and other equivalent embodiments are possible from those skilled in the art.

Therefore, the true technical protection scope of the present disclosure should be defined by the technical spirit of the appended claims.

| Reference Numeral | |
| --- | --- |
| 100: transmitter | 110: light source |
| 120: light splitter | 130: data splitter |
| 140: data converter | 150: modulator |
| 170: light amplifier | 200: phase modulator |
| 210, 220: polarization modulator | 211, 221: first polarized light adjustor |
| 212, 222: polarized light rotation | 213, 223: second polarized light |

-continued

| Reference Numeral | |
| --- | --- |
| unit | adjustor |
| 300: pulse position modulator | 400: receiver |
| 410: polarized light adjustor | 420: polarized light splitter |
| 430: polarized light rotation unit | 440: light detector |
| 450: data restorer | |

What is claimed is:

1. A transmitter in wireless optical communication system, comprising:

a light splitter for splitting light emitted from a light source into two lights;

a data converter for dividing input data into a plurality of divided data in a symbol unit of a predetermined number of bits, and for converting values of a phase bit and a duty bit, which is a remaining bit, at a predetermined position in each of the divided data into a phase control signal and a blocking control signal, respectively;

a modulator for polarization phase modulating two lights split according to the phase control signal, and for conveying or blocking two modulated polarized lights in response to the blocking control signal to modulate a pulse position;

a polarized light combiner for generating a transmission optical signal by combining two polarized lights with a modulated polarization phase and a modulated pulse position; and a light amplifier for amplifying the transmission optical signal and transmitting it through a standby channel, wherein the data converter divides the input data into the plurality of divided data in the symbol unit specified by a number of bits corresponding to a number of slots for dividing a symbol period of the transmission optical signal, and outputs the same two phase control signals or output two different phase control signals according to a bit value of the phase bit in each of the divided data, wherein the data converter determines a slot to which two modulated polarized lights are transferred among a plurality of slots divided in the symbol period according to a bit value of the duty bit, and outputs the blocking control signal in a period corresponding to the remaining slots except for the determined slot.

2. The transmitter of claim 1, wherein the modulator comprises:

a phase modulator for polarization phase modulating and outputting two split lights into two polarized lights having the same or vertical phase difference with each other; and a pulse position modulator for modulating the pulse position by adjusting a time period in which the two modulated polarized lights are conveyed in response to the blocking control signal.

3. The transmitter of claim 1, wherein the light amplifier is implemented with an erbium-doped fiber amplifier (EDFA).

4. A method for transmitting in wireless optical communication system, comprising:

splitting light emitted from a light source into two lights;

dividing input data into a plurality of divided data in a symbol unit of a predetermined number of bits, and for converting values of a phase bit and a duty bit, which is a remaining bit, at a predetermined position in each of the divided data into a phase control signal and a blocking control signal, respectively;

polarization phase modulating two lights split according to the phase control signal, and for conveying or blocking two modulated polarized lights in response to the blocking control signal to modulate a pulse position;

generating a transmission optical signal by combining two polarized lights with a modulated polarization phase and a modulated pulse position; and amplifying the transmission optical signal and transmitting it through a standby channel, wherein the converting comprises:

dividing the input data into the plurality of divided data in the symbol unit specified by a number of bits corresponding to a number of slots for dividing a symbol period of the transmission optical signal;

outputting the same two phase control signals or output two different phase control signals according to a bit value of the phase bit in each of the divided data, determining a slot to which two modulated polarized lights are transferred among a plurality of slots divided in the symbol period according to a bit value of the duty bit, and outputting the blocking control signal in a period corresponding to the remaining slots except for the determined slot.

5. The method of claim 4, wherein the modulating comprises:

polarization phase modulating two split lights into two polarized lights having the same or vertical phase difference with each other; and modulating the pulse position by adjusting a time period in which the two modulated polarized lights are conveyed in response to the blocking control signal.

6. The method of claim 4, wherein the transmitting amplifies the transmission optical signal using an erbium-doped fiber amplifier (EDFA).

7. The method of claim 4, further comprising:

extracting a polarized light with a predetermined phase from a receive optical signal intermittently received through a standby channel;

splitting the polarized light extracted from the polarized light adjustor into two polarized lights perpendicular to each other;

rotating a phase of one of the two split polarized lights by 90 degrees;

detecting light by subtracting the remaining polarized light of the two split polarized lights and the polarized light whose phase is rotated each other; and restoring data in a divided data unit having the number of bits in a predetermined symbol unit, according to a position of a slot corresponding to a period in which light is detected and a polarized light of the period in which the light is detected, among a plurality of slots in which a symbol period of a received optical signal is divided.

8. The method of claim 7, wherein the detecting comprises generating and outputting a current corresponding to whether the light is detected and whether the polarized light is included in the period in which the light is detected.

9. The method of claim 7, wherein restoring the data comprises:

restoring a bit value of a phase bit at a predetermined position in the divided data according to whether the polarized light is included in the period in which the light is detected in the symbol period; and restoring a bit value of a duty bit which is the remaining bit expect for the phase bit from the divided data according to a position of a slot corresponding to a period in which the light is detected.

* * * * *